United States Patent [19]

Long et al.

[11] Patent Number: 4,979,550
[45] Date of Patent: Dec. 25, 1990

[54] WINDOW BLIND CONTROL APPARATUS

[76] Inventors: Richard G. Long, 119 Sutton Dr.; Merle T. Shelton, #9 Hazel Dr., both of Taylors, S.C. 29687

[21] Appl. No.: 343,834

[22] Filed: Apr. 25, 1989

[51] Int. Cl.⁵ ............................................. E05F 15/20
[52] U.S. Cl. .......................................... 160/5; 160/88
[58] Field of Search ...................... 160/DIG. 17, 188; 318/16, 480

[56]  References Cited

U.S. PATENT DOCUMENTS 3,249,148  5/1966  Zablodil et al. .
3,646,985  3/1972  Klann ................................ 160/5 X
4,492,908  1/1985  Stöckle et al. .
4,550,759  11/1985  Archer .
4,618,804  10/1986  Iwasacki .
4,717,104  12/1987  Kobayashi .
4,727,918  3/1988  Schroeder ............................. 160/5

Primary Examiner—Blair M. Johnson
Attorney, Agent, or Firm—Leon Gilden

[57]  ABSTRACT

A window blind control apparatus is set forth wherein the apparatus enables selective control in the opening and closing of an associated window blind arrangement utilizing selectively a photo-electric cell, a radio frequency controller, or a manually displaceable slide switch for the opening and closing of the window blind unit that comprises a series of parallel slats.

5 Claims, 1 Drawing Sheet

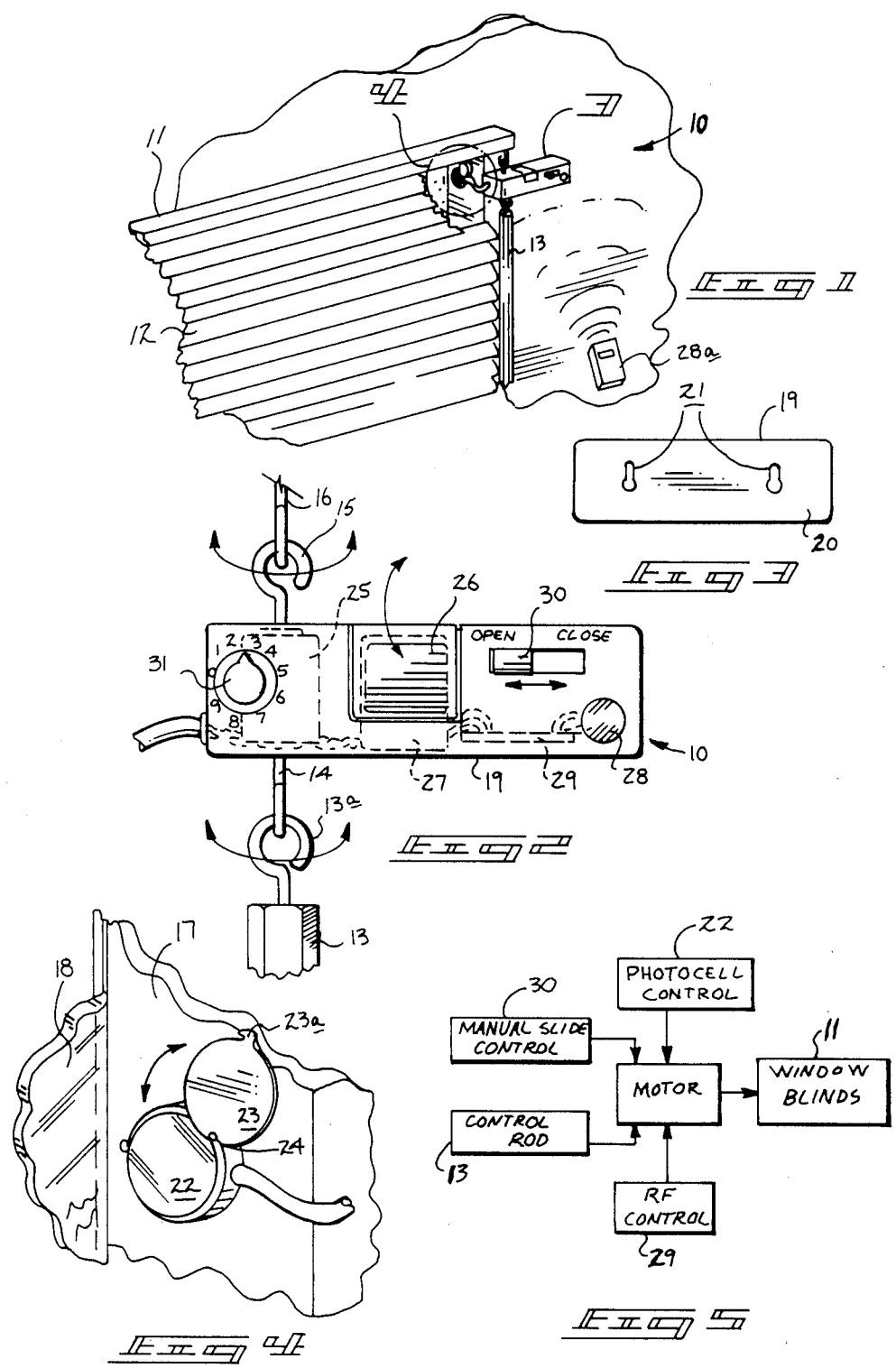

WINDOW BLIND CONTROL APPARATUS

BACKGROUND OF THE INVENTION

1. Field of the Invention

The field of invention relates to window blind control units, and more particularly pertains to a new and improved window blind control apparatus wherein the same enables selective opening and closure of an associated window blind apparatus by a plurality of control means.

2. Description of the Prior Art

Window blind control apparatus is well known in the prior art. The prior art, however, has heretofore failed to provide a window blind control apparatus enabling the utilization of one of a plurality of window blind control means utilizing both remote, automatic, and manual control in the opening and closure of window blind units. For example, U.S. Pat. No. 4,492,908 to Stockle sets forth circuitry arranged to vary the angular orientation of the slats relative to varying sunlight conditions by use of a photo-electric sensor. The patent, while an effective means of providing automatic control, does not utilize the ability to integrate various control mechanisms within a single unit to enable a user the option of over-riding and selectively controlling the orientation of the window blinds.

U.S. Pat. No. 4,618,804 to Iwaski sets forth the use of a remotely controlled hand-held transmitter and a receiving unit associated with the window blind mechanism to enable the remote control of a window blind arrangement. The Iwaski patent is limited in the options available to a user of the device, as is the prior art to Stockle.

U.S. Pat. No. 4,550,759 to Archer sets forth a motor and timing device for the opening and closing of blinds and further including a rotatable handle typically associated with the blinds for the rotation of the blinds to open and close.

U.S. Pat. No. 3,249,148 to Zablodil, et al., sets forth an example of Venetian blinds to be closed in response to a preset condition, which in the case of the instant patent to Zablodil, is in response to a nuclear explosion.

U.S. Pat. No. 4,712,104 to Kobayashi sets forth a window blind unit that may be actuated in response to a remote control frequency selectively operated by an individual.

Accordingly, it may be appreciated that there continues to be a need for a window blind control apparatus that addresses both the problems of compactness in organization and responsive to a plurality of inputs to effect opening and closure of associated window blinds.

SUMMARY OF THE INVENTION

In view of the foregoing disadvantages inherent in the known types of window blind control units now present in the prior art, the present invention provides a window blind control apparatus wherein the same enables window blinds to be opened and closed in response to a plurality of inputs including daylight intensity, radio frequency, electrical manual control, and manual rotation of the window blind control rod. As such, the general purpose of the present invention, which will be described subsequently in greater detail, is to provide a new and improved window blind control apparatus which has all the advantages of the prior art window blind control units and none of the disadvantages.

To attain this, the present invention sets forth a window blind control apparatus that utilizes an electric motor with a rear output associated with a window blind controlling gearing wherein the output unit may be actuated by means of a photo-electric eye oriented between the window blinds and an associated transparent window, or alternatively may be actuated by detection of a radio frequency directed at a radio frequency sensor oriented and positioned within the apparatus, or by the selective positioning of a slide switch to control the opening and closure of the blinds. Still further, the original window blind control rod may be rotated to effect manual rotation of the output of the electric motor to effect opening or closure of the window blind unit.

My invention resides not in any one of these features, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved window blind control apparatus which has all the advantages of the prior art window blind control apparatus and none of the disadvantages.

It is another object of the present invention to provide a new and improved window blind control apparatus which may be easily and efficiently manufactured and marketed.

It is a further object of the present invention to provide a new and improved window blind control apparatus which is of a durable and reliable construction.

An even further object of the present invention is to provide a new and improved window blind control apparatus which is susceptible of a low cost of manufacture with regard to both materials and labor, and which accordingly is then susceptible of low prices of sale to the consuming public, thereby making such window blind control apparatus economically available to the buying public.

Still yet another object of the present invention is to provide a new and improved window blind control apparatus which provides in the apparatuses and methods of the prior art some of the advantages thereof while simultaneously overcoming some of the disadvantages normally associated therewith.

Still another object of the present invention is to provide a new and improved window blind control apparatus wherein the same effects opening and closure of an associated window blind apparatus in response to a plurality of inputs from sunlight, radio frequency, manual displacement of a slide switch, or manual rotation of a window blind control rod.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention in combination with a window blind unit.

FIG. 2 is an orthographic front view taken in elevation of the control apparatus of the instant invention.

FIG. 3 is a rear orthographic view taken in elevation of the instant invention.

FIG. 4 is an isometric illustration, somewhat expanded, of section 4 as set forth in FIG. 1

FIG. 5 is a diagrammatic illustration of the various motor drive inputs to control the opening and closure of the associated window blinds.

DESCRIPTION OF THE PREFERRED EMBODIMENT

With reference now to the drawings, and in particular to FIGS. 1 to 5 thereof, a new and improved window blind control apparatus embodying the principles and concepts of the present invention and generally designated by the reference numeral 10 will be described.

More specifically, it will be noted that the window blind control apparatus 10 is oriented to operate in combination with a window blind 11 that typically contains a series of parallel slats 12 that are pivoted in response to rotation of a rotatable control rod 13 that in turn rotates a conventional drive unit (not shown) for the pivoting of the slats 12. Fixedly mounted to an upper terminal end of the control rod 13 is a control rod hook 13a. The control rod hook 13a is secured to a downwardly extending lower control unit hook 14 extending axially and operatively to a reversing electric motor 25 contained within the housing 19 of the control apparatus. Extending axially of the other end of the motor 25 is an upper control unit hook 15 operatively secured to a downwardly extending window blind control hook 16 that in turn is directed to the window blind mechanism (not shown) conventional in the pivotment of window blind slats 12 of a window blind organization, as illustrated.

The window blind 11 is typically mounted relative to a window frame 17 surrounding a transparent window 18. The housing 19 is fixedly secured to a vertical wall surface, as illustrated in FIG. 1, adjacent the window frame 17 wherein the rear wall 20 of the housing 19 includes a plurality of mounting apertures 21. Extending from and in electrical communication with the motor 25 is a photo-electric cell 22 mounted between the window blind 11 and the window 18 on the window frame 17. The photo-cell is thusly oriented to avail itself of daylight to effect opening of the slats 12 by effecting rotation of the motor 25 and the associated window control mechanism to orient the slots 12 in a horizontal position. During hours of lessened or dimensioned light, the photo-cell will react to the absence of available light and energize the motor 25 to pivot the slats 12 to a generally vertical orientation to effect closure of the window blind unit 11. Available circuitry to effect this operation may be found in U.S. Pat. No. 4,492,908 incorporated herein by reference.

The photo-electric cell 22 thusly mounted further includes a planar pivoted photo-cell shade 23 formed with an outwardly extending handle 23a mounted for movement about a pivot mount 24 on the framework of the photo-cell 22 to enable selective screening of the photo-cell 22 enabling an individual to finely select sensitivity and the actuation of the motor 25 through the photo-cell 22 by enabling the actuation to a more limited time frame dependent upon the degree of shading of the photo-cell 22 by the associated shade 23.

A battery access door 26 is provided through a forward wall of the housing 19 to enable servicing or replacement of a battery 27 contained therein.

A radio frequency (RF) sensor 28 is mounted through the forward wall of the housing 19 for cooperation with a radio frequency transmitter 28a that operates through a radio frequency receiver and decoder 29 mounted within the housing 19 to enable selective actuation of the motor 25 to effect an optional closure and opening of the slats 12 of the window blind unit 11 independently of the photo-cell 22. Additionally, a manual override switch 30 is available to enable selective opening and closure of the window blinds by effecting actuation of the motor 25 to rotate a predetermined number of revolutions in response to a signal from either the photo-cell 22, the radio frequency transmitter 28a, or the manual over-ride switch 30. The number of revolutions available is adjusted through an electric motor adjustment stop 31 to control the number of revolutions of the motor 25. As the motor 25 is merely a reversing motor, any signal from either the photo-cell 22, the manual slide switch 30, or the radio frequency control transmitter 28a will effect actuation of the motor to either open or close the slats 22, as desired. Additionally, an individual may utilize the control rod 13 itself to effect rotation through the motor 25 of the window blind control hook and associated mechanism to effect closure or opening of the window blinds.

As to the manner of usage and operation of the instant invention, the same should be apparent from the above disclosure and accordingly, no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A window blind control apparatus in combination with a window blind unit wherein the window blind unit includes a series of parallel slats pivotally mounted from an opened horizontal position to a closed horizontal position, the window blind control apparatus comprising,
 a housing including a reversing electric motor, said housing fixedly mounted relative to said window blind unit laterally displaced from the slats, and
 a photo-cell means responsive to available light mounted between the window blind unit and a window housing to a vertical support surface adjacent the window blind unit, and
 wherein the photo-electric cell means is remotely mounted relative to the housing for actuation of the motor, and
 the motor including an upper drive member for operative association with a window blind unit and a lower drive operatively associated with a window blind control rod,
 wherein the upper drive & the lower drive are axially aligned through the motor.

2. A window blind control apparatus as set forth in claim 1 wherein the photo-cell means comprises a photo-cell including a shade member pivotally mounted relative to the photo-cell, the shade member including a handle extending outwardly of the shade to enable rotation of the shade to overlie the photo-cell.

3. A window blind control apparatus as set forth in claim 2 further including a manually displaceable slide switch mounted through the forward wall of the housing to selectively pivot the slats to an open or closed position.

4. A window blind control apparatus as set forth in claim 3 further including a plurality of mounting apertures formed through a rear wall of the housing for securement of the housing to a vertical support surface adjacent the window blind unit or to window blind itself.

5. A window blind control apparatus as set forth in claim 4 further including an electric motor adjustment stop means operatively associated with an electric motor for controlling the number of revolutions of the motor during actuation of the motor.

* * * * *